US008990877B2

(12) United States Patent
Hart

(10) Patent No.: US 8,990,877 B2
(45) Date of Patent: *Mar. 24, 2015

(54) INTERFACE FOR USE WITH A VIDEO COMPRESSION SYSTEM AND METHOD USING DIFFERENCING AND CLUSTERING

(71) Applicant: Organizational Strategies International Pte. Ltd., Singapore (SG)

(72) Inventor: Stephen M. Hart, Marietta, GA (US)

(73) Assignee: Organizational Strategies International Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,768

(22) Filed: Oct. 19, 2012

(65) Prior Publication Data
US 2013/0104181 A1 Apr. 25, 2013

Related U.S. Application Data

(60) Provisional application No. 61/549,976, filed on Oct. 21, 2011.

(51) Int. Cl.
*G06F 15/173* (2006.01)
*H04N 21/258* (2011.01)
*H04N 19/503* (2014.01)

(52) U.S. Cl.
CPC ....... *H04N 21/258* (2013.01); *H04N 19/00575* (2013.01)
USPC ............................. 725/116; 709/225; 382/199

(58) Field of Classification Search
CPC ........................ H04N 19/00578; H04N 21/258

USPC ............................. 725/116; 382/199; 709/225
See application file for complete search history.

(56) References Cited

U.S. PATENT DOCUMENTS

| 5,612,744 | A | * | 3/1997 | Lee et al. | 348/416.1 |
|---|---|---|---|---|---|
| 6,041,078 | A | * | 3/2000 | Rao | 375/240.16 |
| 6,654,420 | B1 | * | 11/2003 | Snook | 375/240.16 |
| 6,674,904 | B1 | * | 1/2004 | McQueen | 382/199 |
| 7,454,067 | B1 | | 11/2008 | Pati | |
| 7,546,334 | B2 | * | 6/2009 | Redlich et al. | 709/201 |
| 8,135,232 | B2 | * | 3/2012 | Kimura | 382/268 |
| 8,402,551 | B2 | * | 3/2013 | Lee | 726/27 |
| 8,447,117 | B2 | * | 5/2013 | Liao et al. | 382/199 |
| 2002/0112181 | A1 | * | 8/2002 | Smith | 713/201 |

(Continued)

OTHER PUBLICATIONS

Gonzalez et al., "Digital Image Processing", New Jersey: Prentice Hall, 2007, pp. 818-823.*

(Continued)

*Primary Examiner* — Nasser Goodarzi
*Assistant Examiner* — Michael B Pierorazio
(74) *Attorney, Agent, or Firm* — Vierra Magen Marcus LLP

(57) ABSTRACT

The disclosure relates to a system and method having a common interface to manage and integrate secure information traversing a network with disparate domains. The system and method are capable of rapidly taking external data sources (for example, systems, databases, streams, repositories, websites, etc.) and fusing them under a mediated meta-data layer that allows for data mining, manual and automated analysis and various visualization capabilities in a single application. The system allow for the capability of using data sources, and making secure and appropriate visualization and interoperability functions available in a single portal or interface.

8 Claims, 7 Drawing Sheets

(56) References Cited

U.S. PATENT DOCUMENTS

| | | | |
|---|---|---|---|
| 2003/0036886 A1* | 2/2003 | Stone | 702/188 |
| 2003/0169817 A1 | 9/2003 | Song et al. | |
| 2004/0091151 A1* | 5/2004 | Jin et al. | 382/199 |
| 2004/0155881 A1 | 8/2004 | Kotani et al. | |
| 2005/0138110 A1* | 6/2005 | Redlich et al. | 709/201 |
| 2005/0193311 A1* | 9/2005 | Das et al. | 714/753 |
| 2008/0005666 A1* | 1/2008 | Sefton et al. | 715/523 |
| 2008/0163378 A1* | 7/2008 | Lee | 726/27 |
| 2009/0178019 A1* | 7/2009 | Bahrs et al. | 717/104 |
| 2009/0178144 A1* | 7/2009 | Redlich et al. | 726/27 |
| 2009/0225220 A1 | 9/2009 | Van der Laan et al. | |
| 2009/0254572 A1* | 10/2009 | Redlich et al. | 707/10 |
| 2010/0005179 A1* | 1/2010 | Dickson et al. | 709/228 |
| 2010/0158402 A1* | 6/2010 | Nagase et al. | 382/255 |
| 2010/0250497 A1* | 9/2010 | Redlich et al. | 707/661 |
| 2011/0110603 A1* | 5/2011 | Ikai | 382/260 |
| 2011/0129156 A1* | 6/2011 | Liao et al. | 382/199 |
| 2011/0164824 A1* | 7/2011 | Kimura | 382/199 |
| 2012/0030733 A1* | 2/2012 | Andrews et al. | 726/4 |
| 2012/0173971 A1* | 7/2012 | Sefton et al. | 715/256 |
| 2012/0252407 A1* | 10/2012 | Poltorak | 455/410 |
| 2012/0321083 A1* | 12/2012 | Phadke et al. | 380/255 |
| 2013/0051476 A1* | 2/2013 | Morris | 375/240.24 |
| 2013/0063241 A1* | 3/2013 | Simon | 340/3.1 |
| 2013/0091290 A1* | 4/2013 | Hirokawa et al. | 709/227 |

OTHER PUBLICATIONS

Search report from P.C.T., mail date is Jan. 2, 2013.

* cited by examiner

INTERFACE FOR USE WITH A VIDEO COMPRESSION SYSTEM AND METHOD USING DIFFERENCING AND CLUSTERING

CLAIM OF PRIORITY

This application claims the benefit of priority to U.S. Provisional Application 61/549,976, the entire contents of which are hereby incorporated by reference.

BACKGROUND

1. Field of the Disclosure

The present disclosure relates to an interface to manage and integra+te secure information, and in particular, to a common interface to manage and integrate secure information over disparate servers and domains in a network for use with a video compression system and method using differencing and clustering.

2. Background Information

As video data is increasingly used in computer systems in applications such as video conferencing and video recording, computer systems often cannot keep pace with the computational requirements of video data. Video data streams typically have extremely large bandwidth requirements that can burden the capabilities of even the most high-speed processor to compress the video data for storage or for transmission across a computer network or a telephone system. This compression is typically performed by a central processing unit (CPU) in a computer system with a resulting loss in image clarity due to the failure of the CPU to keep pace with the video data. Complex scenes having many elements that are in motion represent the greatest challenge because they place a tremendous burden on the CPU during the compression and data transfer processes.

Thus, enabling real time video transmission requires a large amount of data compression. Data compression may, however, compromise picture quality. Therefore, great efforts have been made to develop compression techniques allowing real time transmission of high quality video over bandwidth limited data connections. In video compression systems, the main goal is to represent the video information with as little capacity as possible. The most common video coding method is described in the H.264/AVC standards.

A time-consuming step in the compression of video data is to compute differences between successive video frames. A CPU typically computes a difference frame by reading a current video frame into memory and computing the difference between the current video frame and a previous video frame, which was previously stored into a memory in the computer system. Computing the difference typically involves performing an exclusive-OR operation between the current video frame and the previous video frame. In general, any function that effectively represents the difference between two successive video frames can be used with only minor modifications to the related compression algorithm. Hence, a large number of possible functions can be used to compute the difference between successive video frames.

Complicating matters is the increasing integration of a myriad of modern and legacy systems into a unified logical view is provided. Modern software systems are dependent upon the interaction with and extraction of data from a multitude of distributed systems each generally being accessed by unique credentials using proprietary or vendor-specific protocols. Users faced with the extraction and manipulation of data from these disparate sources must manage multiple login accounts, simultaneously run multiple applications for access and manipulation of data from said sources, and develop new or utilize existing tools for correlation and reporting of data.

Accordingly, the user requires a common interface in order to gain access to such distributed systems. Moreover, the user requires an interface that uses (e.g. transmits, receives and views) the compressed data.

SUMMARY OF THE DISCLOSURE

The disclosure relates to a system and method of rapidly taking external data sources (for example, systems, databases, streams, repositories, websites, etc.) and fusing them under a mediated meta-data layer that allows for data mining, manual and automated analysis and various visualization capabilities in a single application. The system allow for the capability of using data sources, and making secure and appropriate visualization and interoperability functions available in a single portal or interface.

In one embodiment of the disclosure, there is a system for sharing secure information between disparate domains, including a plurality of servers, each of the servers having a disparate domain and classification level, wherein each of the servers is connected to a respective network; and a common interface to manage and integrate the plurality of servers using a single source, whereby the secure information traverses the system using video compression to transmit, receive and display data in a secure manner.

In one aspect, the system includes a processor that performs the video compression by receiving a current video frame from a video input; calculating differences between the current video frame and a previous video frame; and processing the calculated differences to determine clusters of image data for compression.

In another aspect, the system further includes scanning the clusters of image data to locate outer rim nodes surrounding the cluster of image data; and determining unprocessed difference points in the image data; and when the unprocessed difference points are found, marking the points as outer rim nodes surrounding the cluster of image data, and when all of the unprocessed difference points have been found, compressing outer rim data representing the outer rim nodes.

In still another aspect, the system further includes eliminating redundant rim nodes; scanning along an interior of the outer rim nodes to detect adjacent internal rims; scanning the outer rim nodes and adjacent rim nodes to locate unfilled internal points; recursively filling unfilled internal points and color capture; and locating floating internal rims using the recursive fill.

In yet another aspect, the system further includes placing a sum of the current video frame and a future video frame captured colors in blocks; placing a difference of the current video frame and the future video frame capture colors in blocks; and compressing the blocks.

In another aspect, the plurality of servers includes a first server classified as an unclassified level, a second server classified as a secret level and a third server classified as a top secret level.

In another embodiment of the disclosure, there is a method for sharing secure information between disparate domains in a network, including connecting a plurality of servers to a respective network, each of the servers having a disparate domain and classification level; and managing and integrating the plurality of servers using a common interface, whereby the secure information traverses the network using video compression to transmit, receive and display data in a secure manner.

DETAILED DESCRIPTION

In view of the foregoing, the present disclosure, through one or more of its various aspects, embodiments and/or specific features or sub-components, is thus intended to bring out one or more of the advantages as specifically noted below.

The present disclosure relates to an interface for managing secure information being traversed over a network between disparate networks and domains. The use of video compression for isolating and capturing video data for video compression is also employed. In one embodiment, there is an interface for a video compression system and method to transmit, receive and display the data in a secure manner. Accordingly, the present disclosure provides an interface that allows the playback of motion video through capturing differences between video frames in a secure manner.

Figure 1:
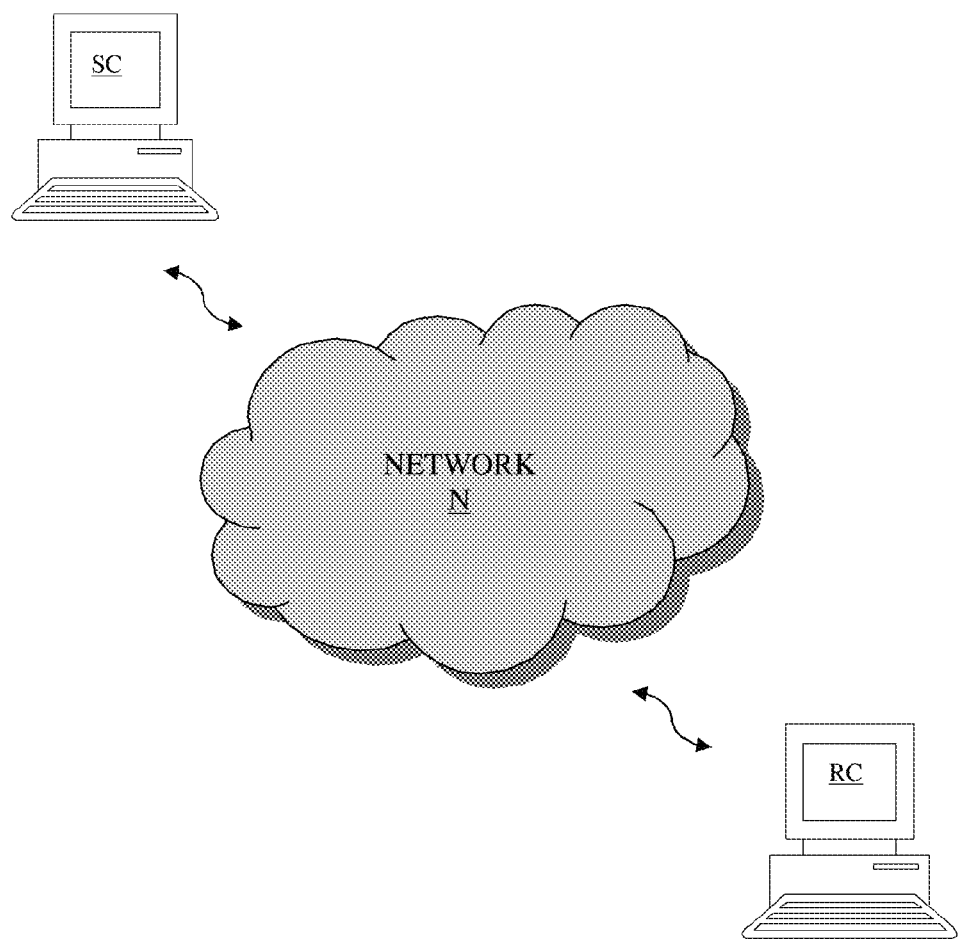
FIG. 1 shows an exemplary system in accordance with an embodiment of the present disclosure.

FIG. 1 shows an exemplary system in accordance with an embodiment of the present disclosure. System 1 includes, for example, a network N to which peripheral devices, such as computers SC and RC may be connected. The peripheral devices can include a processor and a set of instructions, such as an algorithm, that can be executed to cause the peripheral device to perform any one or more of the methods or computer based functions disclosed herein, as well as a video input that captures still and video image data. The video input may be incorporated as part of the peripheral device or a standalone device. It is also appreciated that although the peripheral device in the exemplary embodiments are computers, they are not limited to such an embodiment. For example, the peripheral device may be any mobile device, such as a smartphone, mobile phone, tablet, laptop, PDA, etc. The peripheral device may operate as a standalone device or may be connected, for example, using a network (any type of network may be used, as readily understood in the art), to other computer systems or peripheral devices. Additionally, the system is not limited to the illustrated embodiment, and may include any number or variation of networks and/or peripheral devices.

Figure 2:
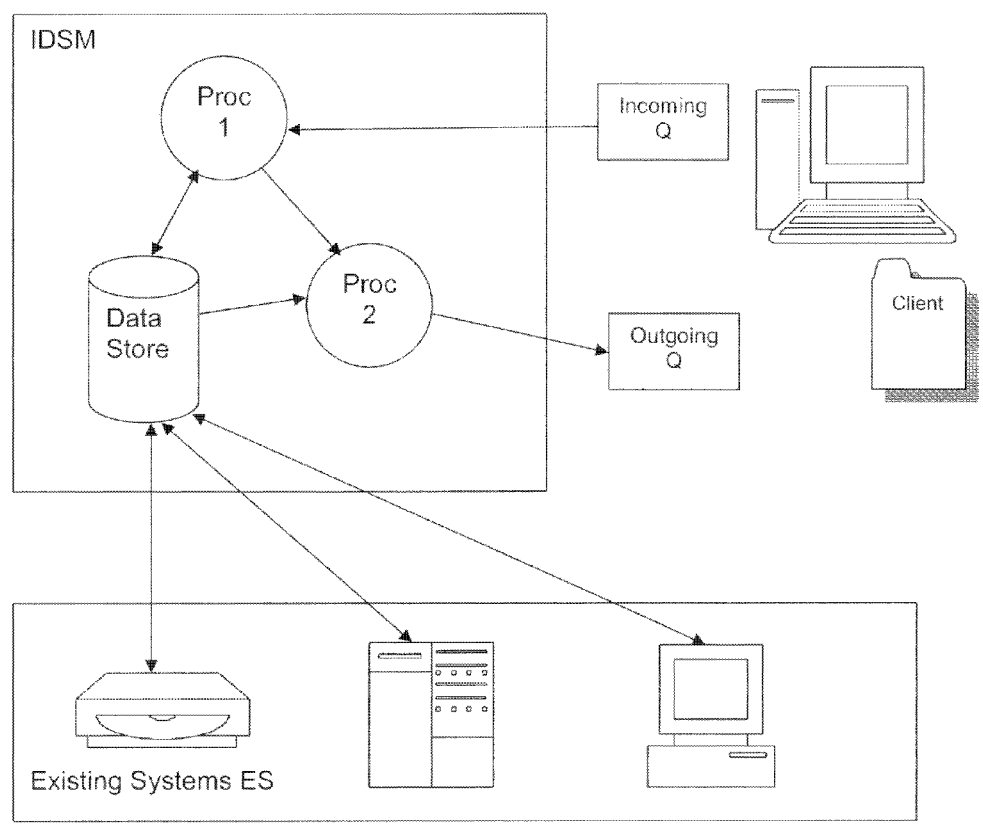
FIG. 2 shows another exemplary system in accordance with another embodiment of the present disclosure.

FIG. 2 shows another exemplary system in accordance with another embodiment of the present disclosure. The system application described herein uses a web services-based interface to validate users and connect them with their resources. These resources consist of information extracted from varied and diverse information repositories typically located in multiple departments and divisions across an enterprise. These repositories may reside in collections of word processor documents (e.g., Word), sophisticated relational databases (i.e., ORACLE, MySQL, SQL Server), document management systems (e.g., Documentum), flat-file databases, and even information "scraped" from the screen by the application interacting with the system as a normal user.

The Inter Domain Services Manager (IDSM) depicted in FIG. 2 is a service oriented architecture (SOA) middleware application that provides integration and inter-operational services for disparate data sources. Access to the integrated data is tailored for the user and can be accessed via: Web services, portals, thin or fat clients, or software as a service (SAAS). The system can rapidly take external data sources, such as systems, databases, streams, repositories and Web sites, and combine them under a mediated metadata layer that allows data mining, manual and automated analysis, and various visualization capabilities in a single application. IDSM provides the system with the ability to fuse and allow discovery of information at different classification levels (e.g. unclassified, secret and top secret)—all within a unified security model. Users can view data, as well as photographs and video. The IDSM framework provides, for example, XML-based interaction with IDSM clients, validation of client-supplied messages, IDSM data store access, and the management of process flow through the system, including identification and service processing logic.

IDSM aggregates intelligence from disparate sources and processes the data into a usable format for the user at all levels of authority. IDSM is primarily used for operations, but it can be used down to the tactical level, and at all levels, its aim is to improve situational awareness and enhance decision-making. IDSM's robust capabilities can be pushed down to personal digital assistants for convoy security and improvised explosive device (IED) detection.

The present disclosure provides an interface through which multiple, disparate systems interoperate. User security, communications, information management, searching, reporting, logging, and system maintenance can be performed on any of these systems from a single point provided by this disclosure. In short, this disclosure allows users to present a tailored view or representation of the underlying systems it integrates, and is built upon an extensible framework that facilitates rapid deployment of new or changes to the existing systems ES it integrates.

Figure 3:
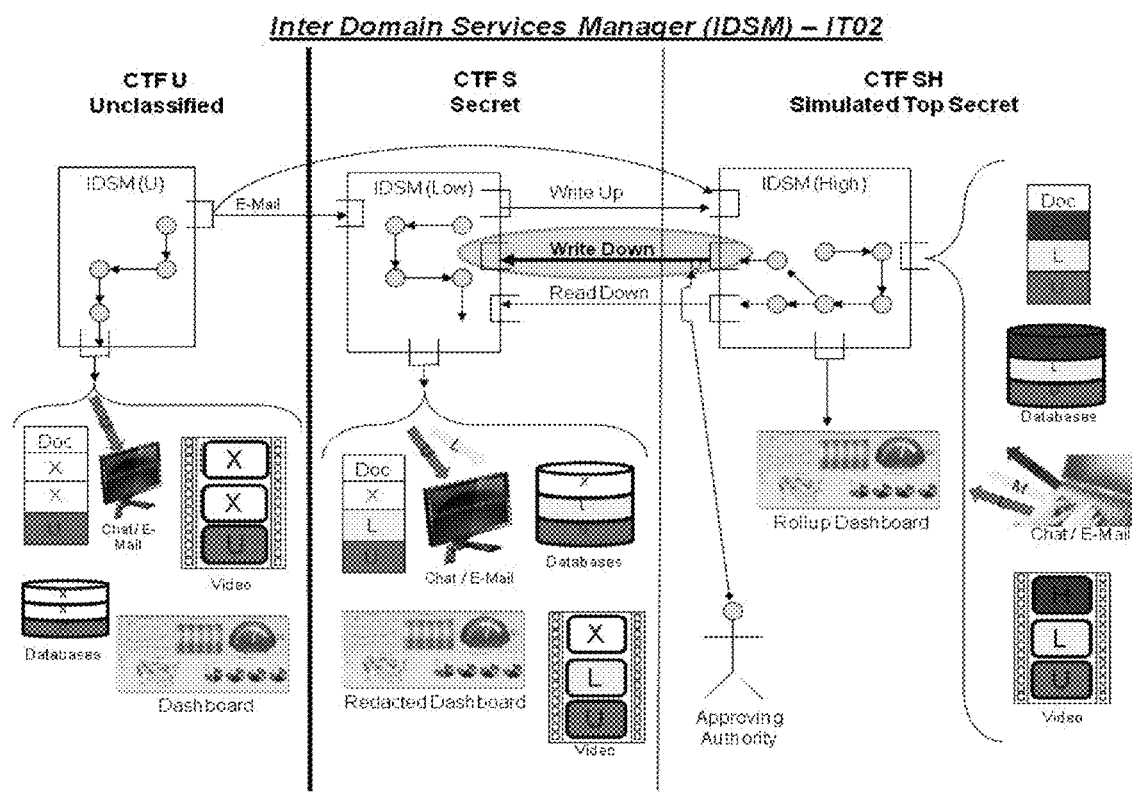
FIG. 3 shows an exemplary diagram of processing differences in accordance with the present disclosure.

FIG. 3 shows another exemplary system in accordance with an embodiment of the present disclosure. The system illustrated in FIG. 3 is a platform with integration, interoperability and security capabilities. This enables the system to rapidly take external data sources (for example, systems, databases, streams, repositories, websites, etc.) and fuse them under a mediated meta-data layer that allows for data mining, manual and automated analysis and various visualization capabilities in a single application. The system allow for the capability of using data sources, and making secure and appropriate visualization and interoperability functions available in a single portal or interface.

Figure 4:
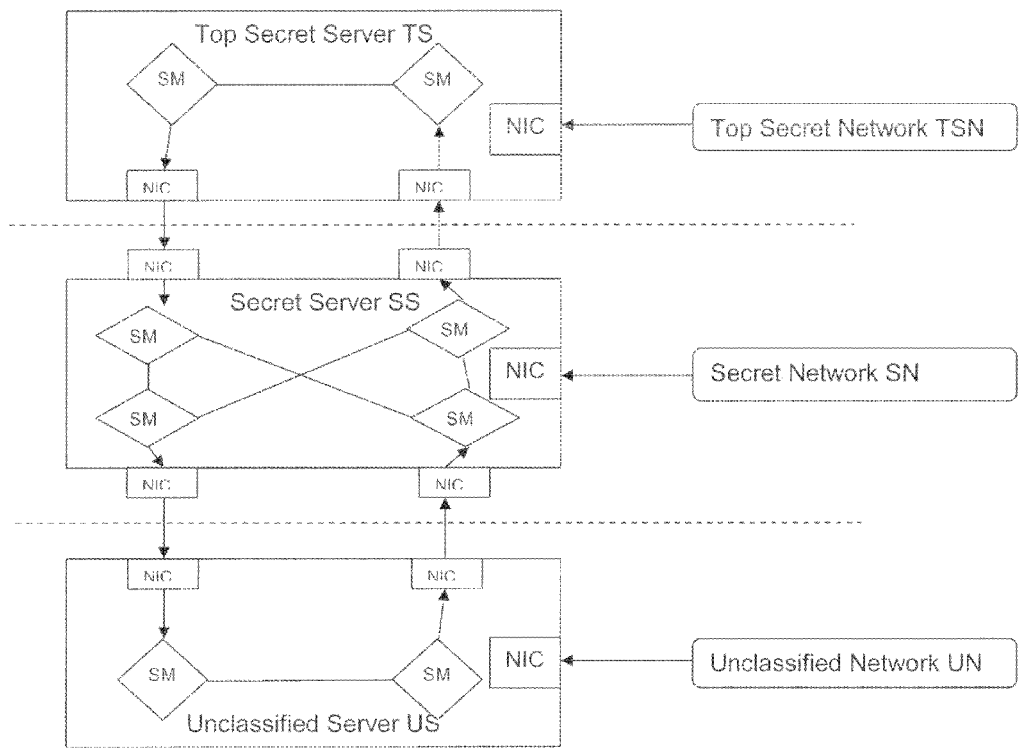
FIG. 4 illustrates an exemplary diagram of differently classified servers in accordance with the disclosure.

FIG. 4 illustrates an exemplary diagram of differently classified servers in accordance with the disclosure. As illustrated in the exemplary embodiment, a top secret server TS, a secret server SS and an unclassified server US receive data from a top secret network TSN, secret network SN and unclassified network UN, respectively. Each of the servers include at least on state machine (SM) and at least one network interface controller (NIC). Each of the servers, as described below, are placed in a security enclave, represented by the dashed lines between servers.

To accommodate the various security requirements, several embodiment may be employed, including, for example, multiple independent levels of security. In this context, a server can be placed in each security enclave instead of a single server, thereby removing the necessity to prove lack of crosstalk between running processes. Single Server Community of Interest (COI) compartmentalization is provided within a single security enclave. COI security designation within a common security enclave have their compartmentalization maintained by the system's state machine (SM) architecture. In the message passing state machine architecture, interactions within the system are handled via an internal message passing architecture. Each message passes through state machines. State transitions are controlled by the state tables defined for each interface. This allows for rapid reconfiguration of the message passing architecture and easy visualization of complex security schemes via simple lattice based access controls representation.

Traffic control is maintained by separate state machines which handle traffic in a single direction on each individual network interface controller (NIC). State machine code can be made identical for all state machine implementations within the system. After the state machine algorithms are proven, the state transition tables can be verified and validated via simple automated methods to assure appropriate traffic is passed/blocked. Functioning of each state machine is defined by the data within the table, in one embodiment, not the code itself. The system places a state machine on each of the network interfaces at the device driver level. This allows for stateful inspection/interception of all traffic into/out of the system's network interface.

Figure 5:
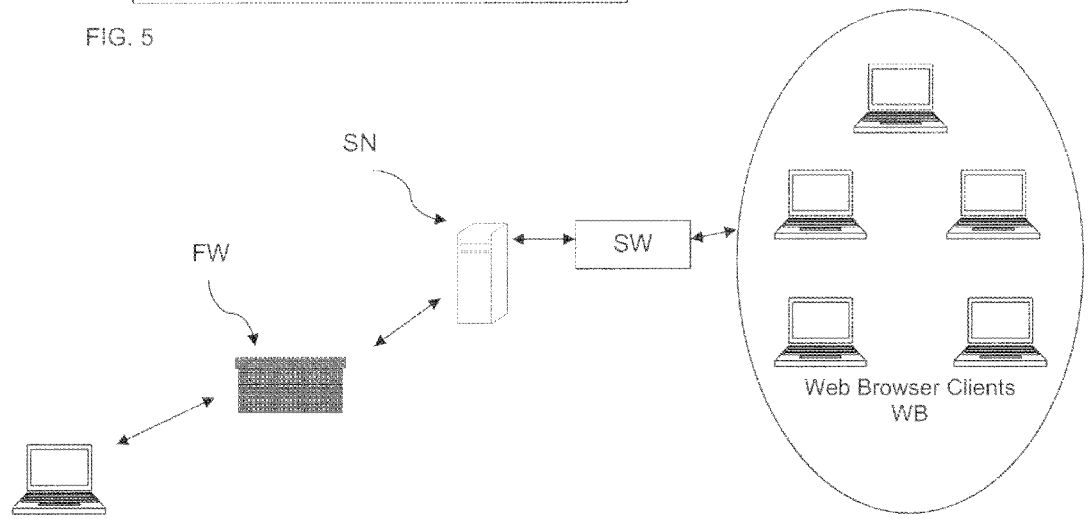
FIG. 5 shows an exemplary system architecture in accordance with the present disclosure.

FIG. 5 shows an exemplary system architecture in accordance with the present disclosure. The system illustrated in the exemplary embodiment of the figure is a secure, web based interface that can simultaneously interface multiple data sources and geo-locations. Since the system is web accessible, HTTPS/SSL can be used for security on any computing or processor device. With the depicted system, secure information may be shared between disparate security domains and operation communities. This is accomplished by integrating external data sources under a common umbrella to create a common operating scenario, which may use a SOA SAAS platform. As illustrated, the system does not require additional hardware and can deploy server side code in any environment using a single source login. In the disclosed exemplary embodiment, the system includes web browser clients WB, a firewall FW, a server SN and a switch SW. Server SN is or provides the common interface that manages and integrates the disparate systems. It is appreciated, however, that the server SN is not limited to only this functionality and may be used in any fashion readily understood in the art.

Figure 6:
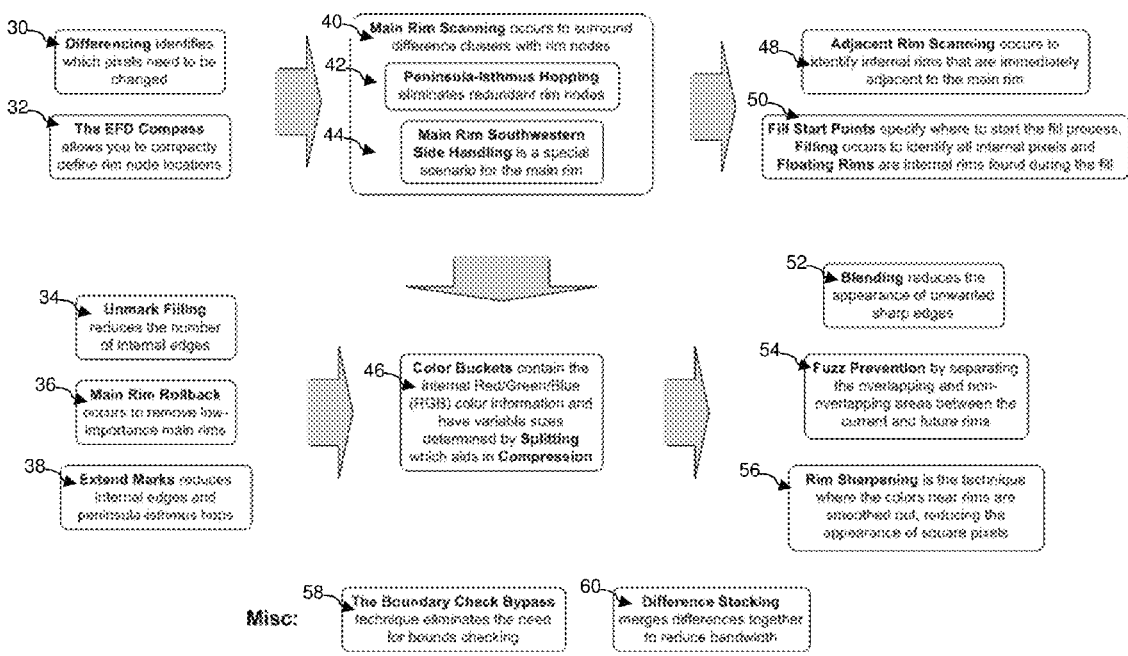
FIG. 6 shows an exemplary diagram of processing differences in accordance with the present disclosure.

FIG. 6 shows an exemplary diagram of processing differences in accordance with the present disclosure. Processing of video data, which may occur at the client end, user end, server end, or at a remote location (or any combination thereof), is accomplished in using the following system and method. Differencing 30 identifies pixels in the video data that require change based on, for example, various thresholds. In order to accomplish the identification, a compass 32 is used to represent direction and coordinates when scanning the data. Main rim scanning 40 acts to surround difference clusters with rim nodes, and eliminates redundant rim nodes using peninsula-isthmus hopping 42 and main rim southwestern side handling 44, as described in more detail below. Once completed, adjacent rim scanning 48 identifies internal rims that are immediately adjacent to the main rim, and fill start points 50 specifies where to begin the fill process, which identifies internal pixels and floating rims. The number of internal edges are reduced using unmark filling 34, low importance main rims are removed using main rim rollback 36 and internal edges and peninsula-isthmus hops are reduced using extend marks 38. To further aid in the compression of data, color buckets 46 include color spectrum information such as internal YBCBR or RGB color information and have variable sized determined by splitting blocks into smaller blocks to identify compression partitions. Blending 52 then reduces the appearance of unwanted sharp edges, and fuzz prevention 54 reduces the amount of distortion (i.e. "fuzz") caused by compression by separating the overlapping and non-overlapping areas between the current and future rims. Additionally, the rim sharpening 56 features further reduce the amount of distortion caused by compression by smoothing colors near the rims to reduce the appearance of square pixels. Other techniques, such as boundary check bypass 58 and difference stacking 60 can also be used to eliminate the need for bounds checking and to merge differences together to reduce bandwidth, respectively. Each of the above-mentioned methods are discussed in more detail below.

As explained above, in order to populate a two-dimensional difference array, each pixel in the current image is compared to the pixels in the prior image. If a color change of a pixel is more than a specified threshold, that pixel is marked as having a difference. To determine position or location of a pixel within an image, a compass 32 is used.

Figure 7:
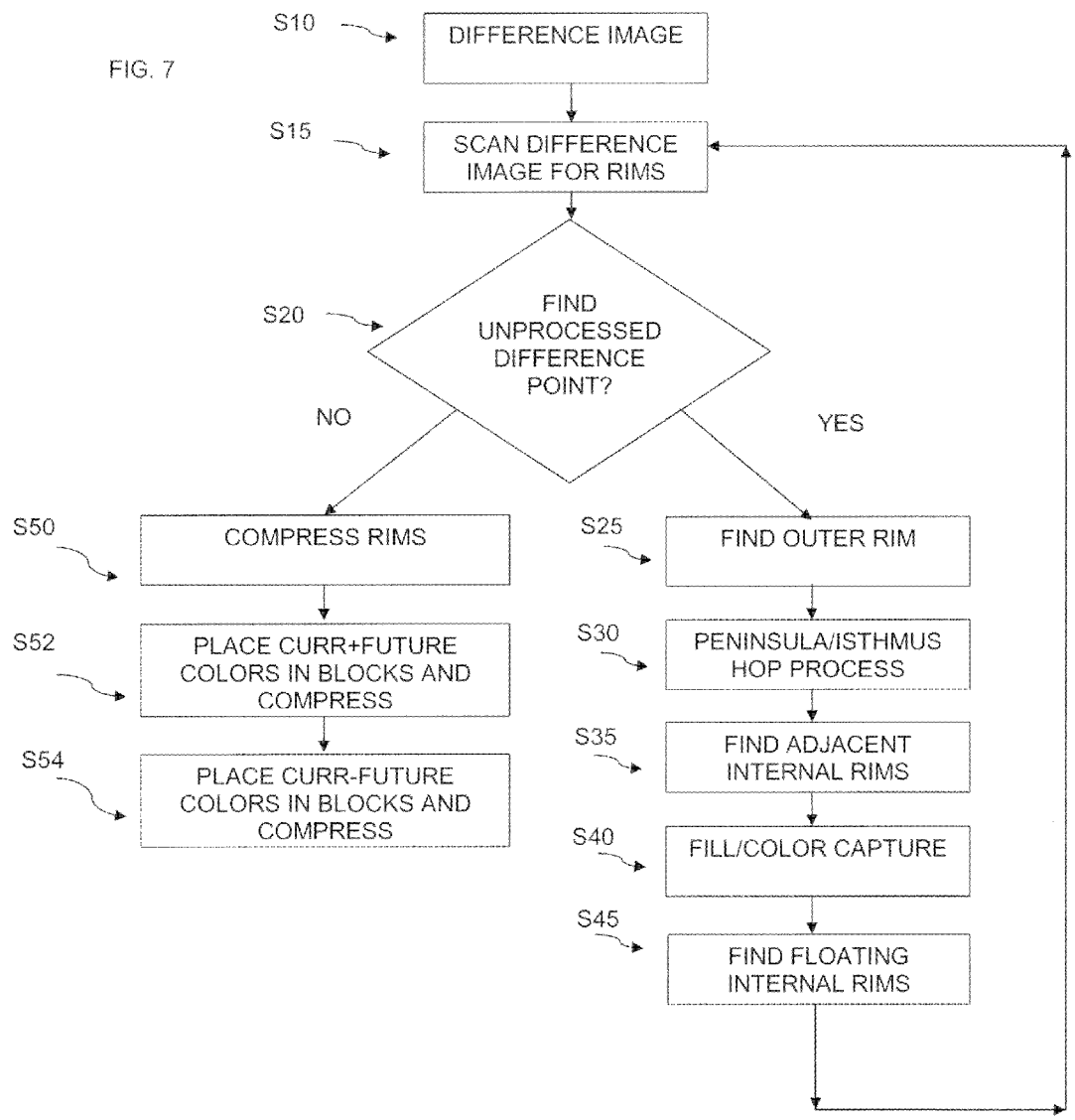
FIG. 7 shows an exemplary flow diagram in accordance with the present disclosure.

FIG. 7 shows an exemplary flow diagram in accordance with the present disclosure. The process flow in accordance with an embodiment of the disclosure is described below. Processing is typically performed at one of the client peripheral devices, although is not limited to such an embodiment. The process begins at S10 where differences are calculated between a first image (e.g. current image) and second image (e.g. previous image). The differences are clustered and scanned to form rim nodes surrounding the clustered data at S15. In S15, redundant rim nodes may also be eliminated using peninsula-isthmus hopping and main rim southwestern side handling. When scanning (S20), if unprocessed difference points are found, the process continues to S25. At S25, the outer rim is located. The number of internal edges are reduced using unmark filling, and low importance outer rims are removed using main rim rollback and internal edges and peninsula-isthmus hops are reduced using extend marks at S30. Adjacent internal rim scanning identifies internal rims that are immediately adjacent to the outer rim at S35, and fill start points specify where to begin the fill process at S40, which identifies internal pixels and floating rims at S45. If no unprocessed difference points are found at S20, then the rims are compressed at S50, the current plus future colors are placed in the blocks and compressed at S52 and color spectrum information (such as YBCBR or RGB) are placed into blocks, blending reduces the appearance of unwanted sharp edges and the resulting data is compressed at S54.

Figure 8:
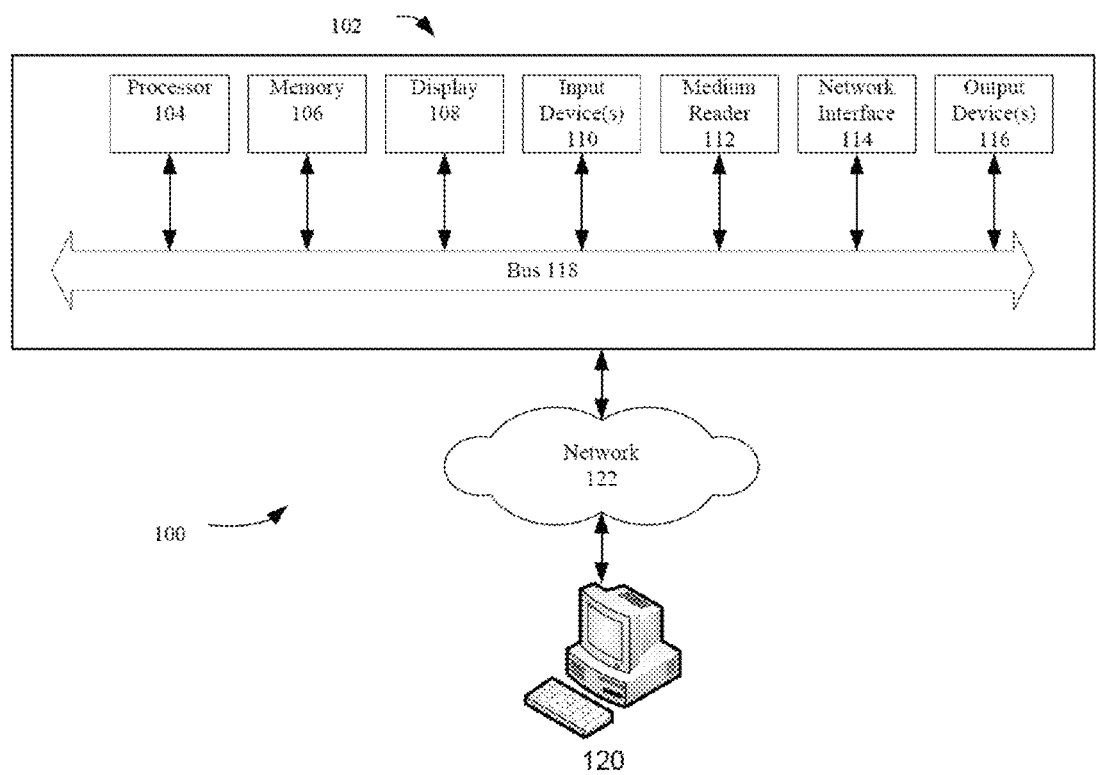
FIG. 8 illustrates an exemplary system for a method for marking outgoing communications for follow-up, according to an aspect of the present disclosure.

As shown in FIG. 8, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video output, a remote control output, or any combination thereof.

Each of the components of the computer system 102 may be interconnected and communicate via a bus 118. As shown in FIG. 8, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via network 122. The network 122 may be, but is not limited to, one or more of a local area network, a wide area network, the Internet, a telephony network, or any other network commonly known and understood in the art. The network 122 shown in FIG. 1 may include both wireless and wired networks.

The additional computer device 120 is shown in FIG. 8 as a personal computer. However, those skilled in the art appreciate that, in alternative embodiments of the present application, the device 120 may be a server computer, a personal computer, a tablet computer, a personal digital assistant, a mobile device, a palmtop computer, a laptop computer, a desktop computer, a communications device, a wireless telephone, a personal trusted device, a web appliance, or any other device that is capable of executing a set of instructions (sequential or otherwise) that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive. Moreover, systems as described herein include one or more devices with the characteristics of the systems described herein along with any other consistent characteristics commonly understood to belong to such systems.

It is also noted that rim compression can be based on the general tendency of rims to go in one general direction for extended periods (which often occurs along smooth edges around moving objects). To take advantage, a rim scan can be performed to seek out stretches where there is a high frequency of the same three directions. Rather than representing the directions with a compass coordinate, as described above, Huffman encoding can be used to compress them.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for sharing secure information between external data sources in a network, comprising:
 a plurality of external data sources, each of the external data sources having a disparate domain and classification level, wherein each of the external data sources are connected to a respective network; and
 a common interface to manage and integrate the plurality of external data sources using a single source, whereby the secure information traverses the system using video compression to transmit, receive and display data in a secure manner at a single portal,
 the video compression including:
  receiving a current video frame from a video input;
  calculating differences between the current video frame and a previous video frame;
  processing the calculated differences to capture and isolate distinct clusters of image data for compression;
  determining unprocessed difference points in the clusters of image data, thereby eliminating use of motion vectors;
  scanning the clusters of image data to locate outer rim nodes surrounding the cluster of image data; and
  when the unprocessed difference points are found, marking the points as outer rim nodes surrounding the cluster of image data, and when all of the unprocessed difference points have been found, compressing outer rim data representing the outer rim nodes.

2. The system for sharing secure information according to claim 1, further comprising:
 eliminating redundant rim nodes;
 scanning along an interior of the outer rim nodes to detect adjacent internal rims;
 scanning the outer rim nodes and adjacent rim nodes to locate unfilled internal points;
 recursively filling unfilled internal points and color capture; and
 locating floating internal rims using the recursive fill.

3. The system for sharing secure information according to claim 2, further comprising:
 placing a sum of the current video frame and a future video frame captured colors in blocks;
 placing a difference of the current video frame and the future video frame capture colors in blocks; and
 compressing the blocks.

4. The system for sharing secure information according to claim 1, wherein the plurality of external data sources include a first server classified as an unclassified level, a second server classified as a secret level and a third server classified as a top secret level.

5. A method for sharing secure information between servers external data sources in a network, comprising:
 connecting a plurality of external data sources to a respective network, each of the external data sources having a disparate domain and classification level;
 managing and integrating the plurality of external data sources using a common interface, whereby the secure information traverses the network using video compression to transmit, receive and display data in a secure manner at a single portal;
 receiving a current video frame from a video input;
 calculating differences between the current video frame and a previous video frame;
 processing the calculated differences to capture and isolate distinct clusters of image data for compression;
 determining unprocessed difference points in the clusters of image data, thereby eliminating use of motion vectors;
 scanning the clusters of image data to locate outer rim nodes surrounding the cluster of image data; and
 when the unprocessed difference points are found, marking the points as outer rim nodes surrounding the cluster of image data, and when all of the unprocessed difference points have been found, compressing outer rim data representing the outer rim nodes.

6. The method for sharing secure information according to claim 5, further comprising:
 eliminating redundant rim nodes;
 scanning along an interior of the outer rim nodes to detect adjacent internal rims;
 scanning the outer rim nodes and adjacent rim nodes to locate unfilled internal points;
 recursively filling unfilled internal points and color capture; and
 locating floating internal rims using the recursive fill.

7. The method for sharing secure information according to claim 6, further comprising:
 placing a sum of the current video frame and a future video frame captured colors in blocks;
 placing a difference of the current video frame and the future video frame capture colors in blocks; and
 compressing the blocks.

8. The method for sharing secure information according to claim 5, wherein the plurality of external data sources include a first server classified as an unclassified level, a second server classified as a secret level and a third server classified as a top secret level.

* * * * *